UNITED STATES PATENT OFFICE.

CHARLES T. SNEDEKOR, OF NEW YORK, N. Y.

WATERPROOFING COMPOUND.

SPECIFICATION forming part of Letters Patent No. 396,622, dated January 22, 1889.

Application filed October 6, 1888. Serial No. 287,411. (No specimens.) Patented in Canada December 7, 1888, No. 48,500.

*To all whom it may concern:*

Be it known that I, CHARLES T. SNEDEKOR, a citizen of the United States, residing at New York, in the county of New York and State of New York, have invented certain new and useful Improvements in Waterproofing Compounds; and I do hereby declare the following to be a full, clear, and exact description of the invention, such as will enable others skilled in the art to which it appertains to make and use the same.

My invention relates to an improved waterproofing compound; and it consists in the commingling of certain ingredients hereinafter specified, and definitely pointed out in the claims.

The above-mentioned compound I have made the subject-matter of an application for patent in Canada, said application being numbered 48,500, and filed December 7, 1888.

The object of my invention it to provide a composition of matter to be applied to surfaces of articles, making them impervious and proof against dampness.

A further object is to provide a waterproofing compound which will obviate the objections and defects heretofore existing in this class of articles, which emit offensive odors, which adhere where the surfaces are brought into contact with each other, and which are more or less defective in other respects.

By my improvement these objections are wholly overcome.

To this end my invention consists in the compounding of the following ingredients: liquid asphalt, glue or English gloy, cotton-seed oil, peroxide of manganese, French talc, china-clay, Russian isinglass, ammonia, linseed-oil, West India copal gum, Zanzibar copal gum, iron pyrites, and refined lamp-black.

In compounding these ingredients I employ the following formula, reckoned on the basis of the production of forty gallons: Of liquid asphalt I take two gallons; glue or English gloy, four gallons; cotton-seed oil, twenty-two gallons, and commingle the same. Into this mixture I introduce ten pounds of peroxide of manganese, thirty pounds of French clay or talc, ten pounds of china-clay, one pound of Russian isinglass, and, finally, one quart of ammonia. The whole mass is then heated to a boiling-point and well stirred for about four hours. In a separate vessel I then take ten gallons of linseed-oil, ten pounds of dissolved West India copal gum, five pounds of Zanzibar copal gum. Heat the mixture until it is thoroughly dissolved, and then cool down to a lukewarm state. I then add to it five pounds of iron pyrites and fifteen pounds of refined lamp-black or other suitable coloring material. This mixture is then added to the other mixture, and the whole is boiled for about five hours, and then allowed to cool down to about 150°. In this state it is ready for application. In case other colors instead of lamp-black should be used, the amounts required to be introduced should be governed by the degree of brilliancy desired.

The above compound is applicable to metal, fabrics, or other material with the same effective result, the quality of the compound making it a preservative as well as waterproof. It is not affected by changes in the weather and adds life and strength to fabrics when applied.

In applying my compound to fabric I coat the surface with one or more coatings, according to the purposes for which the article is to be used. The coating may be spread on the article in any desired manner, it being required to be regular and smooth. The coated article is then subjected to a drying process, and is then ready for use.

In applying the compound to metal the metal is preferably heated to insure a more perfect adhesion. It is then either immersed or coated with the compound and finally dried.

Care should be used in avoiding the selection of a starchy or sized fabric.

The compound can be used on silks, cottons, linens, and all fine or coarse fabrics with the same general result.

Many minor changes can be made by the selection of the ingredients the equivalent to those described without departing from the nature and principle of my invention.

The process herein described of applying and compounding my composition can be varied or departed from in some respects without in the least changing the nature of the invention.

Having thus described my invention, what I claim as new, and desire to secure by Letters Patent, is—

1. A composition of matter for waterproofing purposes, consisting of asphalt, glue, cotton-seed oil, peroxide of manganese, talc, china-clay, isinglass, ammonia, linseed-oil, copal gum, pyrites, and coloring material, substantially as described.

2. A composition of matter for waterproofing purposes, consisting of liquid asphalt, glue, cotton-seed oil, peroxide of manganese, French talc, china-clay, Russian isinglass, ammonia, linseed-oil, West India copal gum, Zanzibar copal gum, pyrites, and lamp-black, substantially as described.

In testimony whereof I affix my signature in presence of two witnesses.

CHARLES T. SNEDEKOR.

Witnesses:
THOS. MASTERSON,
H. B. STANSBURY.